Nov. 16, 1937.  G. J. CORPORON  2,099,330
FORMING APPARATUS FOR WOOL HAT AND OTHER TUBULAR FELT BODIES
Filed Aug. 6, 1936   3 Sheets-Sheet 1

Inventor:
George J. Corporon,
By Emery, Booth, Townsend, Miller & Weidner
Attys

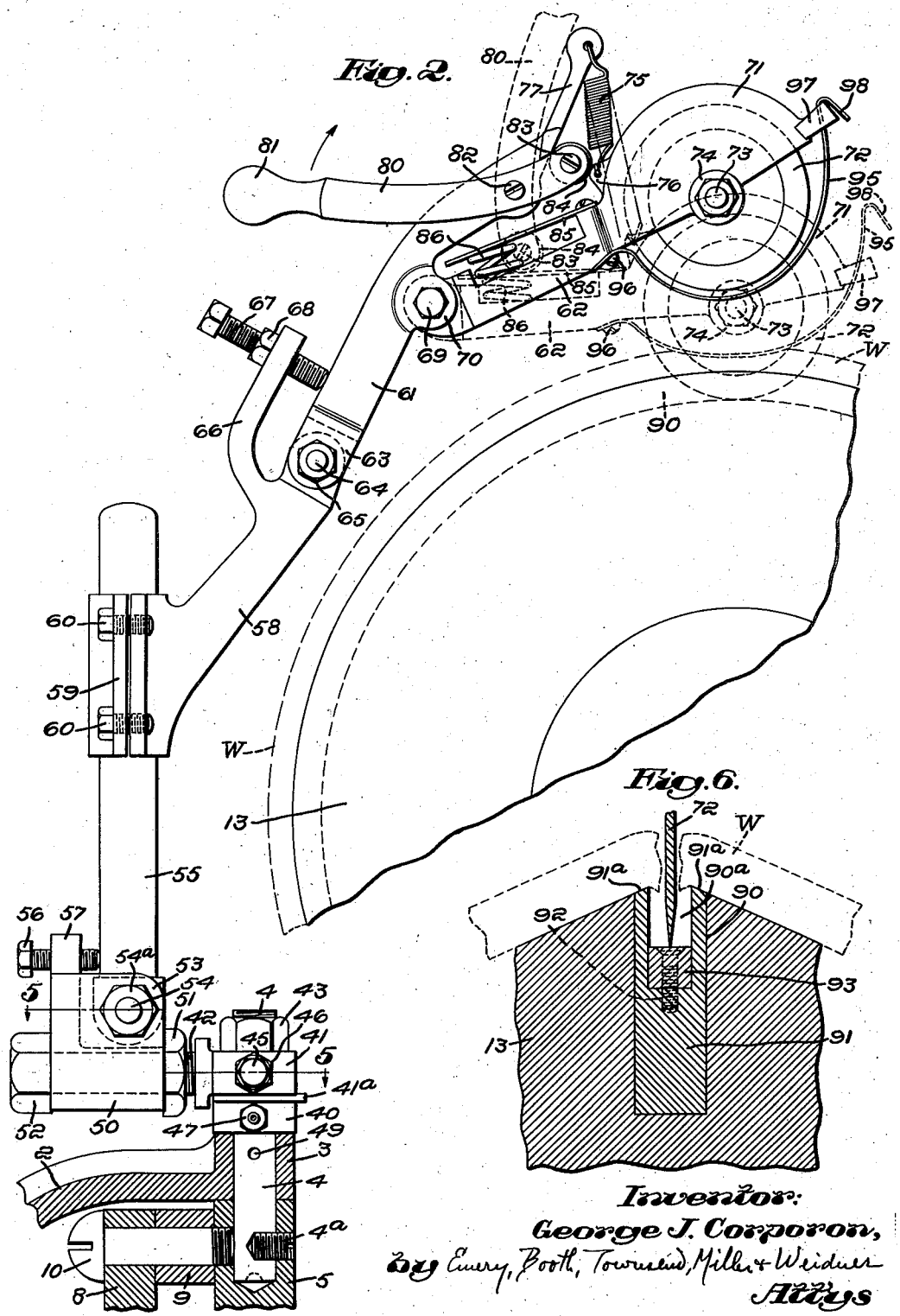

Inventor:
George J. Corporon,
by Emery, Booth, Townsend, Miller & Widner
Attys

Patented Nov. 16, 1937

2,099,330

UNITED STATES PATENT OFFICE 2,099,330

FORMING APPARATUS FOR WOOL HAT AND OTHER TUBULAR FELT BODIES

George J. Corperon, Newburyport, Mass., assignor to Merrimac Hat Corporation, Amesbury, Mass., a corporation of Massachusetts Application August 6, 1936, Serial No. 94,625

9 Claims. (Cl. 19—149)

My present invention relates to apparatus for forming tubular bodies of felt, as in the manufacture of wool hats and other wool felt articles, and more particularly aims to provide in association with such apparatus novel and improved means for severing the tubular felt transversely into the individual hat or other article bodies.

In the drawings illustrating by way of example one form of apparatus embodying the invention, Fig. 1 shows a wool hat-body forming apparatus, in side elevation, with a portion of the frame in section;

Fig. 2, upon a larger scale, corresponds to a portion of Fig. 1, including the body cutting means and the associated form or block on which the felt is built up;

Fig. 6 is a longitudinal section, on an enlarged scale, through the central peripheral portion of the forming block, corresponding to the top central portion of Fig. 3, including a portion of the cutter disk, and the cooperating drive means therefor on the block.

Referring now more particularly to the drawings the apparatus as a whole which I have selected for the purpose of illustrating my present invention is a wool hat-body former, of the Zimmerman type, being generally similar to that disclosed, for example, in United States Patent No. 212,910 of March 4, 1879. It will be understood, however, that in its broader aspects the invention is applicable in connection with any felt forming apparatus of the class for developing tubular felt bodies.

Figure 1:
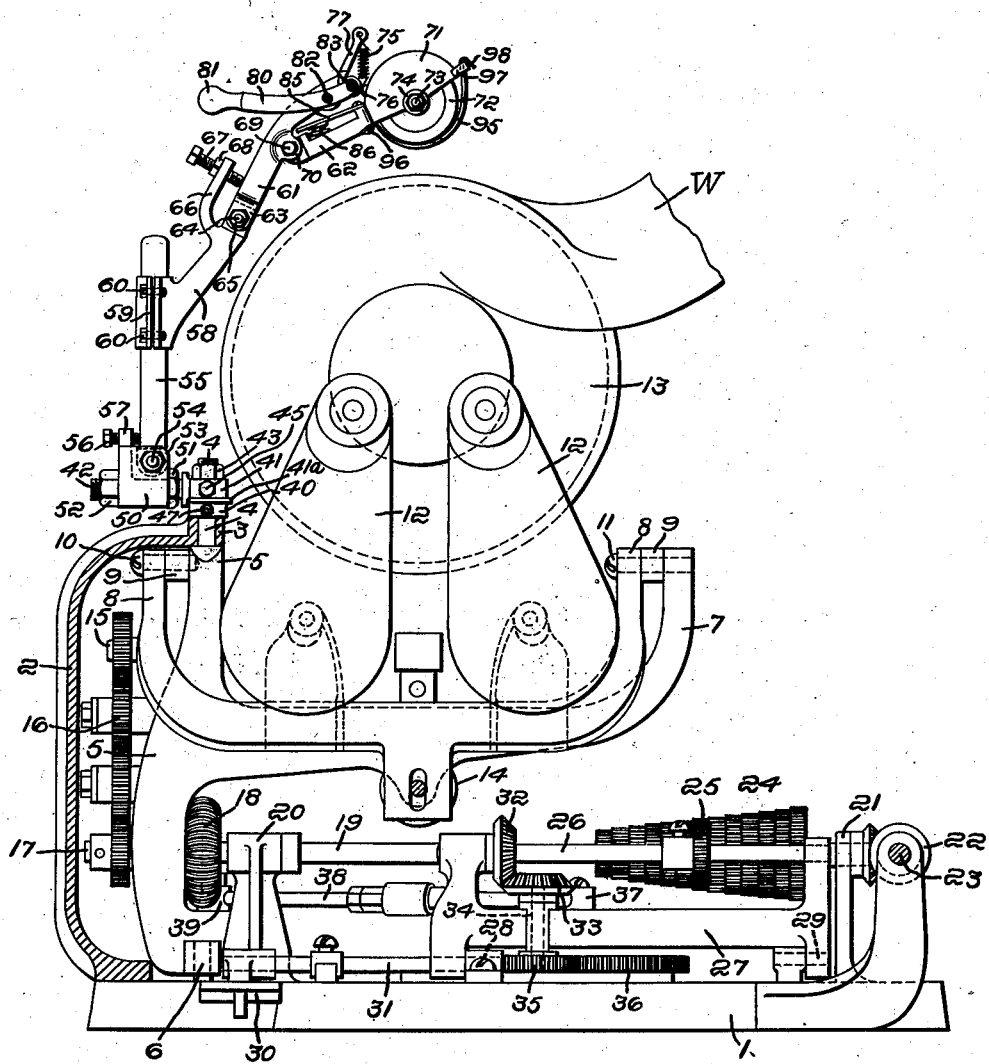
Figure 3:
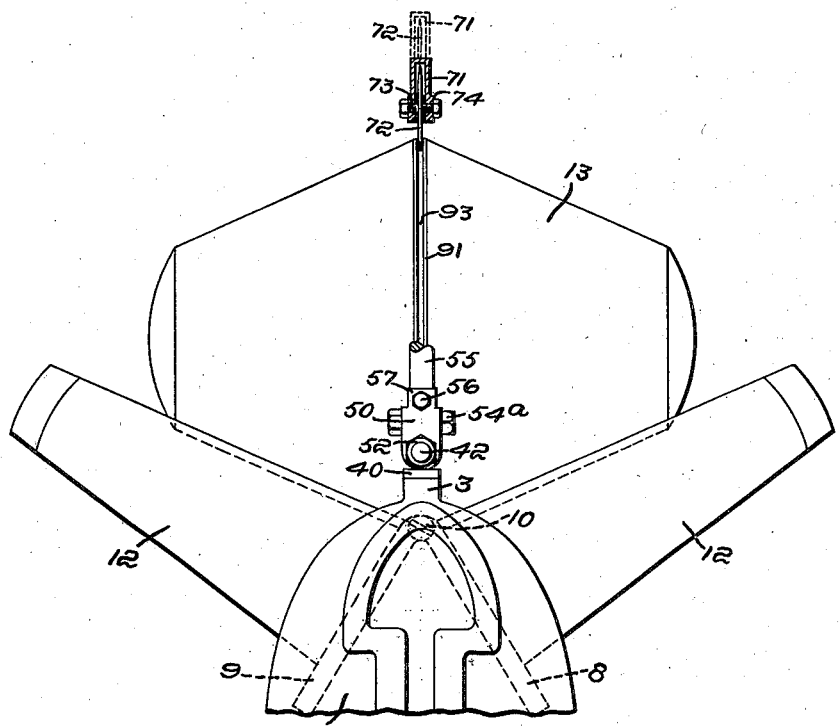
Fig. 3 is a front elevation of the upper portion of the forming apparatus including the forming block, portions of the cutting mechanism being broken away.

In the present instance, considering now Fig. 1, the stationary frame of the machine comprises the base of bed-plate 1 and the curved front standard 2 having at its upper end a vertical bearing 3 for the top pivot post 4 of the main, horizontally swinging, roller-frame 5. The latter has a lower pivot on the bed-plate, in vertical line with the pivot 4, as at 6. This main roller-frame includes the upright portion seen adjacent the vertical pivot axis 4 referred to, and a rearwardly projecting arm 7, upturned at its rear or right end, Fig. 1, and forming with the upper front portion of this main roller-frame a U-shaped bearing bracket for the roller-supporting frames or yokes 8 and 9; see also Fig. 3.

The pair of yokes 8 and 9 are hung on a common horizontal axis by means of the pivot pins 10 and 11 on the upper front portion of the main roller-frame 5 and on the arm 7 thereof, respectively. On these yokes are mounted in the usual manner the two pairs of form-supporting conical rolls 12, 12, one pair on each yoke, at the two sides of the machine, each roll being rotatable on its own axis and the four rolls being disposed on their yokes so as to provide a V-shaped cradle for the felt-receiving forming block or former indicated as a whole by the numeral 13.

Such former, for felt hat bodies, has the general form of a pair of opposed truncated cones base to base and rounded at their smaller ends. Various sizes of formers may be used depending on the size and type of hat, and the supporting rolls 12 are adjustable in a vertical plane to conform to formers of the different sizes, by moving the yokes 8, 9 toward or from each other about their horizontal axis 10, 11 by means of an adjusting screw 14, Fig. 1. The forming block in each instance rests freely on the conical supporting rolls 12 and is frictionally driven by them, to wind on the lap or web of wool W coming from the carding machine, not shown.

The supporting rolls 12 are rotatively driven in the usual or any preferred manner, as for example in said Patent 212,910, the pair of rolls at one side the machine being driven from the opposite pair, by ring gears at their bases. The driving pair of rolls has gearing connection with a shaft 15, Fig. 1, journaled in one of the yokes 8, 9 and itself driven through a gear train 16 on the main, swinging frame 5. The end gear of this train is fast on a short shaft 17 carried by said main frame and having at its inner end a gear (not shown) meshing with a gear 18 on the main shaft 19, said gears being so disposed and having their teeth so formed as to enable them to remain in mesh in any position of swinging movement of the main frame 5 about its vertical axis 4, 6, between the approximate limit positions shown in Fig. 4. The main shaft 19, carried by bearing brackets 20, 21 on the bed-plate 1, is driven through gearing connections 22 with the pulley or power shaft 23.

Figure 4:
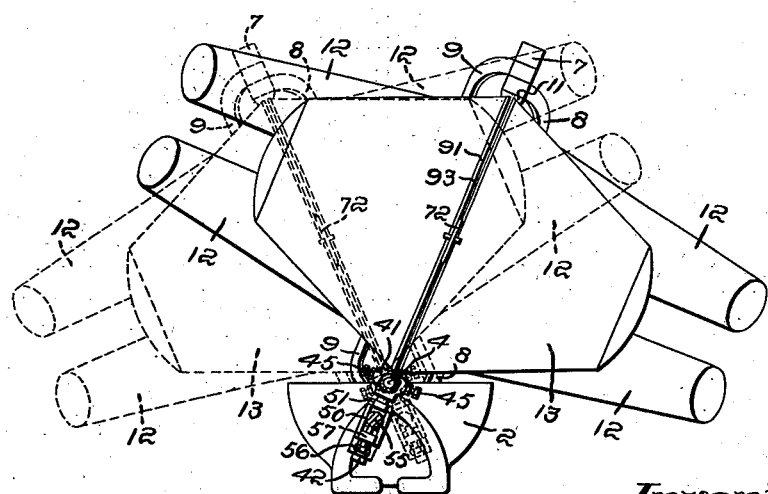
Fig. 4 is a plan of the forming block and its supporting rolls, showing the limit positions of their horizontal swinging movement.

During the winding on of the web W the entire main frame 5, and hence the supporting rolls 12 and the forming block 13, is swung steadily in one and the opposite direction upon its vertical pivot axis 4, 6, to and from the position such as illustrated in Fig. 4, so as to present first one end and then the other of the block toward the web coming from the card. In this manner the wool web is caused to cover the rounded ends of the conical block and to build up on it a closed-end tube of felt.

The mechanism for so swinging the block and its supporting frame may be such as more fully shown in said Patent 212,910. As seen in Fig. 1, the main shaft carries a gear cone 24 for selective engagement with a shiftable pinion 25 on a countershaft 26, whereby the latter may be driven at variable speeds correspondingly to vary the speed of the swinging movement of the block 13 as required for different sizes of the latter. This countershaft is journaled in a rock frame 27 pivotally supported on the bed-plate as at 28 and 29 for movement on a horizontal axis, so as to engage or disengage the pinion 25 with the gear cone 24. A pedal 30 on the extended pivot rod 31 coaxial with the pivot 28 is provided for rocking the countershaft frame 27, to start and stop the swinging movement of the block 13 and its frame 5.

Referring still to Fig. 1, a bevel pinion 32 on the countershaft 26 meshes with a like pinion 33 on a short shaft 34 on the countershaft frame 27. At the lower end of said shaft is a gear 35 which drives a toothed crank-disc 36 for reciprocating a cross-head 37 and link 38 connected to a laterally projecting arm 39 on the main frame 5, similarly as in the patent referred to. The longitudinal movement of this link is effective to swing the frame, the block-supporting rolls and the forming block, alternately between the positions as represented in Fig. 4.

The mechanism as described to this point may be of standard or any preferred construction, of which that of the Patent 212,910 is an early example. It will be understood that the lap or web of felt coming from the card and winding onto the forming block builds up into a closed-end tube, until the desired weight of felt has been reached, suitable for the particular hat bodies or other articles being manufactured. When the desired weight of felt has been attained, the resulting felt tube must be severed transversely and removed from the block. In the case of a hat forming machine such as shown, utilizing a double-ended conical block, the felt tube is cut circumferentially at its central portion, of largest diameter, thus providing two hat bodies.

Heretofore so far as I am aware it has been customary for the operative to perform this cutting operation by the use of sheep shears or the like, held in the hand. This manual cutting operation requires considerable skill and training on the part of the operative. It is particularly difficult by reason of the swinging movement of the block, being generally done while the block is in motion, since it is undesirable to interrupt the latter because the wool web continues to be fed out from the card and must constantly be taken up on the block.

In accordance with my present invention I have provided means for automatically performing the felt cutting operation, under the control of and at the will of the operative. As herein illustrated said means is constructed and arranged and so related to the machine as a whole and particularly to the forming block that it follows the swinging movement of the latter, in readiness to perform the cutting operation at any selected instant. In the illustrated example my cutting mechanism is operated from and by the block itself, which latter is specially constructed for the purpose.

Figure 5:
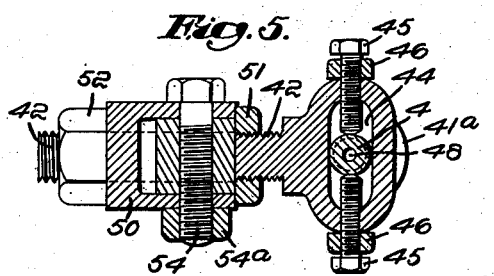
Fig. 5 is a section on the line 5—5 of Fig. 2.

Referring now to Figs. 1 and 2, the top pivot post 4 for the main frame 5, having bearing support at 3 in the upper end of the stationary front standard 2, is formed as a detachable post, see particularly the lower portion of Fig. 2, fixedly pinned in the upper part of the swinging frame 5, as by the pin 4ª. This pivot post 4 is extended upwardly beyond the stationary standard 2 where it is provided with a collar 40 on which is received the slotted head 41 of a horizontal stud 42; see also Fig. 5. A bearing washer 41ª may be provided between the collar 40 and head 41. The post 4 extends upwardly through the head 41 and is threaded to receive a nut 43 for retaining the stud 42 in position to support the cutter mechanism to be described.

The stud 42 and the parts carried thereby are bodily adjustable both angularly of the axis of the post 40 and crosswise thereof, by reason of the slotted formation 44 of the head 41. Opposed clamping screws 45, 45 having lock nuts 46 are tapped through the head 41 and are engageable at their inner ends with the upper portion of the post 4, to secure the stud 42 in the desired adjusted position thereon. The collar 40 of the post 4 may be provided with a lubricant receiving connection 47 communicating with a longitudinal channel 48 in the post 4, Fig. 5, having an outlet as at 49 supplying lubricant to the post-supporting bearing 3.

Turning again to Fig. 2, the supporting stud 42 carries a base block 50 apertured at its lower portion to receive the stud. This base block is angularly adjustable about the axis of the stud 42, being held in the desired position thereon as by the inner nut 51 and the outer nut 52 threaded on the stud. At its upper portion the base block 50 is recessed to form vertical ears 53 which are apertured in alignment to receive the horizontal pivot pin 54 of the cutter post 55. The latter is adjustable about the axis of the pivot 54, and is held in fixed adjusted position as by tightening the securing nut 54ª on the pin 54. Fine adjustment may be had by means of an adjusting screw 56 threaded through a lug 57 rising from the base block 50.

On the cutter post 55 is adjustably positioned a bracket 58 having a split collar portion 59 at its lower end received on the post and provided with tightening screws 60, 60 for adjustably securing the bracket at the desired height on the post. An adjustable extension 61 at the upper end of the bracket 58 constitutes the direct support for the cutter arm 62. Ears 63 at the lower end of said extension straddle the reduced upper end of the bracket 58, said parts being apertured to receive a horizontal pivot pin 64 having a nut 65 for securing the extension 61 in the desired position of adjustment relative to the bracket 58. The latter has an upwardly projecting finger 66 carrying an adjusting screw 67 having a lock nut 68, for obtaining fine adjustment of the extension 61.

The cutter head comprises the cutter arm 62 referred to and associated parts. One end of the cutter arm is pivoted as at 69 between ears 70 on the extension 61. At its opposite, free end is an arcuate housing 71 for the cutter member proper, herein a rotary steel or other cutter disk 72. This cutter disk is rotatably supported on a shaft 73 held in bearings 74 on the housing 71.

The cutter arm 62 and the cutter disk 72 thereon are normally held up in inoperative position, out of engagement with the forming block 13, as by means of a spring 75 having one end attached to the arm 62 or housing 71, as to the lug 76 on the latter, the other end of the spring being secured to a finger 77 projecting upwardly from the extension 61.

Means is provided whereby the operative may instantly throw the cutter into operation at any desired time. Such means desirably is so arranged that the cutter disk will automatically remain in active position until subsequently released. For this purpose I have provided a cutter operating lever 80 having a handle portion 81 and a forked portion which straddles the extension 61 and is pivoted on the latter as at 82. Beyond said pivot, the forked portion of said operating lever 80 has journaled on it as at 83 a cam roll 84 adapted to engage a plate 85 on the upper face of the cutter arm 62 when the operating lever is swung upwardly and toward the right in Fig. 2, in the direction indicated by the arrow. The upper end of the spring-securing finger 77 is adapted to serve as a stop for the inward movement of the operating lever, in the dotted line position of the latter as shown in Fig. 2.

The pivot point 82 of the operating lever and its spring are so disposed that the roll 84 at the lower end of the lever may cross center with respect to a perpendicular to the cutter arm 62 and the plate 85 thereon, in passing between the full line and the dotted line position of the lever. Hence the operating lever and the cutter arm and its cutter disk are retained in either of said positions by the spring 75, so that the cutter disk automatically holds its active or inactive position as the case may be. The plate 85 engaged by the cam roll 84 of the operating lever desirably is of spring metal and bears against a comparatively heavy spring 86 on the cutter arm, for a purpose to be referred to later.

As previously stated, the cutter disk is cooperatively driven by the forming block 13, the latter being particularly constructed and arranged for that purpose. Referring to Fig. 6, and noting also Figs. 2 and 3, the medial, largest diametered portion of the block is provided with a circumferential channel 90 into which the periphery of the disk projects in its active position, as represented in said figures. The conical forming blocks such as the element 13 are usually built of wood. In such cases, and as illustrated herein, I supplement the channel 90 in the block by fitting into it a metal or other annular band 91, the outer portion of which is itself channeled as indicated at 90$^a$. At the bottom of this channel I secure, as by screws 92, a liner ring or detachable cutter track 93 of suitable metal or other material, for example, a fairly hard bronze, adapted to have frictional driving engagement with the edge of the cutter disk, as best seen in Fig. 6. While such liner member may sometimes be dispensed with, allowing the disk to have driving engagement directly on the band 91, along the bottom surface of the channel 90$^a$, I have found it a substantial convenience and otherwise desirable to employ a readily replaceable track element such as the easily demountable ring 93. Such element may quickly be removed and refinished or a new one substituted, in case it becomes objectionably scored or worn by the cutter disk, whereas it would be practically impossible to replace the entire band 91 which generally requires to be built into the block 13 initially, during the construction of the latter and as a substantially integral portion of it. It will be noted, for example, that the top surfaces of the band, at the opposite sides of the channel 90$^a$, are sloped in conformity with the adjoining surfaces of the block itself, as at 91$^a$, so as to continue the latter without interruption completely to the actual cutter channel 90$^a$.

When the cutter is thrown in by the operative, the disk 72 first engages and quickly penetrates the layer of wool felt W on and traveling with the block 13, and comes into driving engagement with the cutter track 93, receiving rotation from the latter. The cutter is left in said active position until the complete circumference of the block has rotated past it and the felt tube has been completely severed, into two hat bodies in the present example.

As noted above, the plate 85 on the cutter arm overlies a spring 86 seated on said arm. In the inoperative position of the cutter this spring is not loaded, as the cam roll 84 is disengaged from the plate. Incidentally, the cutter arm is at such time limited in its upward movement by engagement of the lug 76 against the cam roll which in turn comes against the fixed finger 77. In the proper adjusted position of all the parts, the cutter arm is so disposed that when the operating lever 80 is raised to throw in the cutter, the movement of said lever and its cam roll 84 may be continued somewhat beyond the point at which the cutter disk comes into contact with its track 93. Such continued movement of the cutter lever causes the cam roll further to depress the plate 85 so as to load the spring 86. This accordingly forces and holds the cutter disk in spring-pressed yielding driven engagement with its track, under adequate pressure to insure proper driving of the disk to obtain a clean cutting action upon the felt. This pressure may be accurately and finely adjusted through the medium of the several adjustments previously referred to, the desired setting being obtained by manipulation of the lower adjusting screw 56 and the upper or final adjusting screw 67. Larger adjustments, such as may be required in shifting to a forming block of a different size, may be had by raising or lowering the bracket 58 on the post 55, as well as by tilting the latter about its pivot 54. Further, the whole cutter assembly may be adjusted to center the disk on its track, by shifting the stud 42 crosswise the pivot post 4, while proper alignment of the disk and its track upon the block is obtained by angularly adjusting the stud 42 about the post 4, supplementing such adjustment, if necessary, by angular adjustment of the bracket 58 relative to the post 55. All possibilities under the various operating conditions are accordingly provided for.

Considering further Fig. 2, and as also seen in Fig. 1, means desirably is provided in association with the cutter for holding the felt W in place upon the surface of the block during the cutting operation and overcoming any tendency of the cutter to displace or deform the felt. As illustrated, such means herein comprises a combined felt presser and guard element 95 in the form of a spring metal or other yieldable strip longitudinally slotted to straddle the cutter disk and secured at one end to the cutter arm, as by one or more screws 96. This presser strip is arcuate, approximately complementing the cutter housing 71, so that in the inactive position of the cutter, as in full line in Fig. 2, the edge portion of the latter is substantially completely enclosed.

The opposite end of the presser strip or guard 95 extends through an eye 97 on the cutter housing 71 and is bent down as at 98 to hook over said eye. When the cutter is thrown in, this presser or guard element 95 engages lightly upon the outer face of the felt, closely adjacent the cutter disk, as illustrated in the dotted line position in Fig. 2, where it is effective to clear the felt from the cutter, both before and behind the latter, and to keep the felt in place on the block. It also continues its function of shielding the cutter, reducing possibility of accident in the event of carelessness on the part of the operative. The hooked end 98 of the strip is free to lift away from the eye 97, during a cutting operation, as seen in said Fig. 2.

It will be apparent from the foregoing that I have provided automatic cutter means for felt-tube forming machines, said means having capacity for universal adjustability, to meet all operating conditions. In actual practice the present invention, as typified in the means herein illustrated for the purposes of explanation, has produced more regular, rapid and otherwise improved cutting of the felt tubes, particularly for hat bodies, with less required skill or training on the part of the operatives.

My invention is not limited to the particular embodiment thereof illustrated and described herein, and I set forth its scope in my following claims:

I claim:

1. In a felt-body forming apparatus for hat and like bodies, said apparatus including a rotatable former supported for horizontal swinging movement, in combination therewith, a rotary cutter having operative and inoperative positions relative to said former, means coaxial with the axis of swinging movement of said former for rotatably supporting the cutter to swing with said former, and means carried by said supporting means for rendering said cutter operative or inoperative at the will of the operator and indifferently during a swinging or non-swinging status of said former.

2. An automatic cutter device for felt-body forming apparatus employing a swinging rotary former, comprising, in combination, supporting means adapted for mounting on said apparatus in position to swing with said former, a cutter arm movably carried by said means, a cutter disk rotatably mounted on said arm, means for moving said arm to and from a position of operative engagement of the cutter disk with said former to sever a felt-body thereon, means for automatically retaining said arm and cutter disk optionally in or out of said operative position.

3. An automatic cutter device for felt-body forming apparatus employing a swinging rotary former, comprising, in combination, supporting means adapted for mounting on said apparatus in position to swing with said former, a cutter arm movably carried by said means, a cutter disk rotatably mounted on said arm and operable to sever a felt-body on said former by peripheral driven engagement of the latter, and means providing for universal bodily adjustment of the cutter disk relative to a former in position on the apparatus.

4. A felt-body former for felt-body forming apparatus, comprising, a main rotatable body element or block adapted for free frictional driving support on such apparatus, a circumferential groove formation on said body element at a desired line of transverse severance of a felt-body to be wound thereon, a cutter-track holding ring fixed in said groove formation and itself having an external peripheral grooved portion, and a cutter track element removably secured in said grooved portion of said ring.

5. In a felt-body forming machine having a swinging rotary former block on which the felt body is formed, a rotary cutter, drive means for the cutter on the forming block, a pivoted arm carrying the cutter, and supporting means for the arm including a post mounted for axial turning movement in angular alignment with the swinging former block.

6. In a felt-body forming machine having a swinging rotary former block on which the felt body is formed, a rotary cutter, drive means for the cutter on the forming block, a pivoted arm carrying the cutter, supporting means for the arm including a post mounted for axial turning movement in angular alignment with the swinging former block, and means for universally adjusting the position of the cutter relative to said block.

7. In a felt-body forming machine having a swinging rotary former block on which the felt body is formed, a rotary cutter, drive means for the cutter on the forming block, and supporting means on the machine for said cutter, said means comprising an upright pivot post, a collar on and adjustable angularly and laterally of said post, a stud extending from said collar, a base block on said stud and angularly adjustable axially of it, a cutter post adjustably supported by said block, a bracket on and adjustable lengthwise said post, an adjustable extension member on said bracket, and a cutter arm movably held on said extension member.

8. In a felt-body forming machine having a swinging rotary former block on which the felt body is formed, a rotary cutter, drive means for the cutter on the forming block, and supporting means on the machine for said cutter, said means including a pivoted cutter arm, and upright supporting means for the cutter arm, said means being mounted for movement with the swinging former block and including a plurality of adjustable connections affording universal adjustability of the cutter position.

9. Felt-body forming mechanism for hat and like bodies, comprising, in combination, a main stationary frame, a roll-frame, upper and lower pivotal connections for supporting the roll-frame for horizontal swinging movement on the main frame, a set of rotatably driven supporting rolls on the roll-frame, a rotatable body-former supported on and driven by the rolls, said rolls and former swinging with said roll-frame, a rotary cutter disk adapted for circumferential engagement with said body-former to sever a felt body wound thereon, and cutter supporting mechanism mounted coaxially with the pivotal connections of the roll-frame and main frame and connected to swing with the roll-frame, whereby the cutter may be operatively engaged with the body-former in any position of the roll-frame and during the swinging thereof, said mechanism including means normally holding the cutter in inactive position.

GEORGE J. CORPORON.